US006087570A

United States Patent [19]

Sherlock

[11] Patent Number: 6,087,570

[45] Date of Patent: Jul. 11, 2000

[54] STRINGED MUSICAL INSTRUMENT VIBRATO APPARATUS FEATURING SELECTIVE STRING PITCH CONTROL

[76] Inventor: John Sherlock, 1275 Dana Ave., Palo Alto, Calif. 94031

[21] Appl. No.: 08/909,386

[22] Filed: Aug. 11, 1997

Related U.S. Application Data

[63] Continuation-in-part of application No. 08/568,457, Dec. 7, 1995, abandoned, which is a continuation of application No. 08/191,276, Feb. 1, 1994, abandoned, which is a continuation-in-part of application No. 07/940,478, Sep. 4, 1992, abandoned.

[51] Int. Cl.$^{7}$ .......... G01D 3/04

[52] U.S. Cl. .......... 84/307; 84/308

[58] Field of Search .......... 84/297 R, 298, 84/299, 307, 308, 309, 313

[56] References Cited

U.S. PATENT DOCUMENTS

| | | | |
|---|---|---|---|
| 3,407,696 | 10/1968 | Smith et al. | 84/297 |
| 3,411,394 | 11/1968 | Jones | 84/313 |
| 4,457,201 | 7/1984 | Storey | 84/313 |
| 4,497,236 | 2/1985 | Rose | 84/298 |
| 4,608,906 | 9/1986 | Takabayashi | 84/313 |
| 4,632,005 | 12/1986 | Steingerger | 84/313 |
| 4,681,011 | 7/1987 | Hoshino | 84/313 |
| 4,944,208 | 7/1990 | Kusek | 84/313 |
| 4,955,275 | 9/1990 | Gunn | 84/313 |
| 5,173,565 | 12/1992 | Gunn | 84/298 |
| 5,198,601 | 3/1993 | McCabe | 84/298 |

*Primary Examiner*—Robert E. Nappi
*Assistant Examiner*—Kim Lockett
*Attorney, Agent, or Firm*—Jeffrey A. Hall

[57] ABSTRACT

A vibrato apparatus for a stringed instrument, the instrument having a body and a neck extending from the body, the apparatus comprising, tuning elements on the neck and a bridge member on the body to demarcate a string plane and a vibrating portion of the strings which extend in a longitudinal direction in the string plane. A vibrato member is secured on and is pivotal about a pivot axis which is essentially parallel to but distanced from the string plane and transversely oriented in the longitudinal direction. A plurality of vertically pivoting rocker arms each securing the body end of a respective string and operably secured to a lever which is resistibly secured to a spring and to the vibrato member. A slug tuning element allows for vertical adjustments of the plurality of rocker arms so that by varying a lever moment of the lever the plurality of rocker arms are each selectively moved thereby altering the tuning of the strings. A bus bar is operably linked to the lever by a switch linkage which allows for independent control of tuning and pitch for each string by selective pivoting of the vibrato member. A saddle unit may be integrated with the vibrato apparatus and a remote activation unit supplied which allows for activation of the vibrato apparatus from a foot pedal.

1 Claim, 12 Drawing Sheets

STRINGED MUSICAL INSTRUMENT VIBRATO APPARATUS FEATURING SELECTIVE STRING PITCH CONTROL

RELATED APPLICATIONS

This is a continuation-in-part of Ser. No. 08/568,457 filed Dec. 7, 1995 which is a continuation of Ser. No. 08/191,276 filed Feb. 1, 1994 which is a continuation-in part of Ser. No. 07/940,478 filed Sep. 4, 1992, all now abandoned.

BACKGROUND OF THE INVENTION

1. Field of Invention

This invention relates generally to stringed musical instruments and specifically to devices designed to harmonically, melodically or modally bend any combination of strings without changing the initial tuning of the instrument, such as guitars. It further relates to above described devices that can be easily operated by use of a remote activator such as foot pedal.

2. Description of Prior Art

Vibrato devices have been widely used for many years with stringed instruments for creating a vibrato sound which results from rapid raising or lowering of pitch during vibration of the strings. Heretofore a wide variety of devices have been proposed and implemented for this purpose.

Usually such devices are used with electric guitars and are incorporated into the guitar bridge assembly. Most vibratos require the musician to alter the tension on all of the strings of a stringed instrument simultaneously and effect pitch change during vibration of the strings.

Representative prior art embodiments include a moving tailpiece on the body of the instrument to accomplish this tension change. In such devices, a pivot point is established and the tailpiece of the assembly pivots about that point. A counter spring is typically utilized to counteract the pull of the strings on the tailpiece.

An example of this genre is disclosed in U.S. Pat. No. 4,497,236 to Rose which shows such a device for a guitar with a lever pivoting the tailpiece. Movement of the lever by the musician increases or decreases overall pitch. However, this movement of the strings as a group results in a significantly non uniform variation in individual string pitch due to the inherent and nonlinear pitch variations characteristic of guitar strings of different diameters subjected to uniform displacement.

Accordingly, use of known vibrato devices often results in a frustrating out of tune vibrato sound and string configuration because the pitch relationships within chord arrangements are often distorted. Adding to this problem is the tendency of the knife edge type string support mechanisms to dull with repeated use, which in turn make it difficult to insure accurate string return to the selected initial tuning configuration when the vibrato lever is released, resulting in an out of tune instrument.

One proposed solution to the former problem is shown in U.S. Pat. No. 3,411,394 to Jones in which a vibrato system secures the tail end of each string at different relative distances from the pivot point of the vibrato tailpiece so that the end of each string can be displaced through a greater or lesser distance relative to the other strings. Although the end of each string rotates through the same angle relative to the pivot point, this differential displacement occurs because strings positioned at a greater radial distance from the pivot point are translated over a longer distance than strings positioned at a lesser radial distance from the pivot point. However, the musician is required to use a specific string gauge at specific tuning in order for this device to function properly.

An additional problem with many of the prior art tremolos is that they support the strings in a relatively balanced or equilibrium condition when the guitar is tuned. As demonstrated in U.S. Pat. No. 4,632,005 to Steinberger, the strings attach to a single bridge plate. As a result, the total tension forces acting upon any one of the guitar strings is dependent in part upon the tension forces acting upon the remaining strings of the guitar. Therefore, adjustment in tension or breakage of any single string results in at least some alteration in the tension of the other strings. This tendency can make both the initial tuning and retuning of the strings a relatively laborious process requiring some degree of musical expertise.

In addition to the problems of maintaining pitch relationships between strings, existing patented tremolos cannot selectively alter the pitch of individual strings or combination of strings, i.e., there is no string switch ability. Nor do conventional tremolos allow the user to broadly determine the rate at which each string will be altered while maintaining the original tuning of the strings.

Furthermore, the saddle pieces of the bridge assembly, which align and guide the strings and set the intonation along the length of the strings, are, in much of the prior art, held in place by floating pins perpendicular to the string. This design allows for lateral movement of the saddle which correspondingly results in a discordant "buzz" in the string when it is vibrated resulting in unwanted noise and a loss of tonal duration. Also, there are no built in safeguards to allow the user to raise the pitch of the strings without over stressing and thus breaking a string, or means to finely control the rate the handle alters the pitch of the strings, nor mechanisms to easily lock the handle in an alternate tuning.

Finally, because most tremolos require hand manipulation of the lever attached to the bridge assembly it is often necessary for the user to break from the tempo to utilize a vibrato device through hand manipulation

SUMMARY OF THE INVENTION

As a result of the limitations inherent in the existing vibratos, there is considerable room for improvements in the field. More specifically, there exists a need for a vibrato assembly which will accommodate rapid individual and independent string tension adjustments between selected tuning configurations, will eliminate dissonant string buzz and loss of sustain, can be used without tuning instability.

The present invention overcomes the shortcomings of previous inventions by allowing the musician to: 1) easily, quickly and accurately preset which string or combination of strings is raised or lowered or left unchanged, in pitch, 2) broadly determine what rate the strings will bend and what pitch they will be altered to, 3) continue using the instrument with the vibrato even if one or more strings independently goes out of tune or breaks, 4) produce a more pleasing sound due to the accompanying bridge/saddle design which reduces the discordant buzz of bridges used in previous inventions, 5) prevent string breakage due to over stressing, 6) allow for fine control of the pitch tension with the handle, 7) allow the handle to lock the strings in an alternate tuning and 8) manipulate the apparatus by use of a remote activator without interrupting the melody.

There is also disclosed an improved back plate is included allowing quick and easy rate change adjustments, and a remote activation unit is provided for use in different locations, i.e. foot peddle, behind the guitar against the hip, between one's elbow and the guitar, etc.

BRIEF DESCRIPTION OF THE DRAWINGS

The accompanying drawings, which are incorporated in and constitute a part of the specification, show a preferred embodiment of the invention and together with a general description given above and the detailed description of the preferred embodiment given below, serve to disclose the principals of the invention.

DETAILED DESCRIPTION OF THE PREFERRED EMBODIMENT

Reference will now be made in detail to the present preferred embodiments of the invention and illustrated in the accompanying drawings.

In accordance with the present invention, there is provided a vibrato apparatus for a stringed musical instrument, the instrument having a body and a neck extending from the body, the apparatus preferably comprising: tuning means on the neck and bridge means on the body to demarcate a string plane and a vibrating portion of the strings which extend in a longitudinal direction in the string plane, a vibrato member secured on the body having means for pivoting the bus bar member of the vibrato apparatus within a selected range of positions relative to the body about a pivot axis. The pivot axis being essentially parallel to but distanced from the string plane and transversely oriented in the longitudinal direction with a plurality of pivoting rocker arms each resistably braced against the body end of a respective string and operably linked to lever means resistibly braced against spring means and to the vibrato member. Rate adjustment slug means are communicatively linked to the plurality of rocker arms and to the lever means allowing vertical adjustments of the plurality of rocker arms so that by varying a lever moment of the lever means the plurality of rocker arms are each selectively moved thereby altering the tuning of the strings. A bus bar is operably linked to the lever means by a switch linkage means for allowing independent control of tuning and pitch for each string by selective pivoting of the handle.

Figure 1:
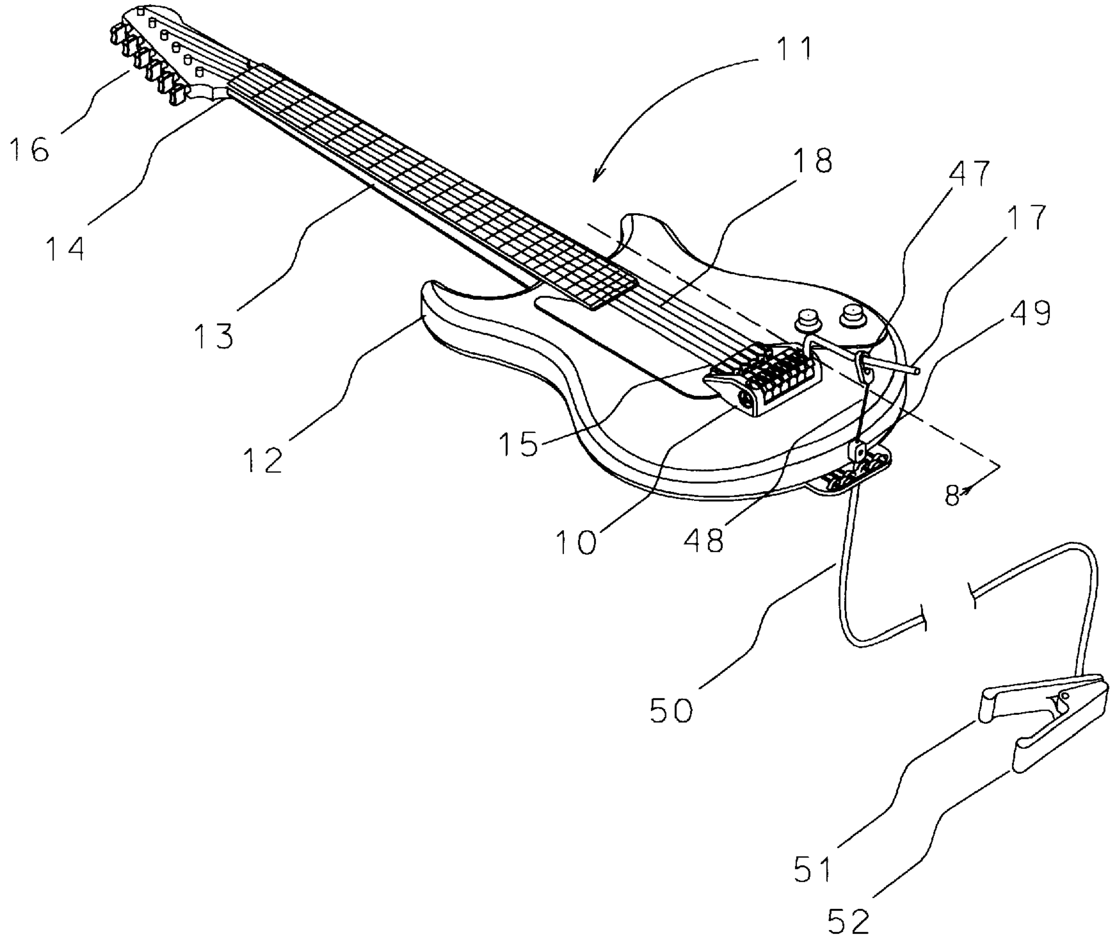
FIG. 1 shows a perspective view of the apparatus in a stringed instrument according to the invention.

With reference to FIG. 1, the stringed musical instrument 11 is shown as a guitar, having a body 12, a neck 13, strings neck end 14, and tuning machines 16. Each of the strings 18 has a string neck end 14 and a string body end 15. Tuning means such as tuning machine 16 on the neck and saddle housing 30 on body 12 demarcate a string plane and a vibrating portion of strings 18 which extend in a longitudinal direction in the string plane. The vibrato apparatus 10 shown in FIGS. 1, 7, 8 and 9, is secured on body 12 having means, preferably handle 17 for pivoting bus bar 22 within a selected range of positions relative to the body about a pivot axis. Busbar 22 rides on bearing 23 nestled in housing 31 and with the use of centering spring 24 is held in a neutral position defined as the position where busbar 22 can be operably linked to lever linkage 20 without altering position of busbar 22 or lever means 38. In this embodiment one end of the centering spring 24 is fixed to the bus bar 22, the other end of the centering spring 24 rotates freely within the housing 31 until engaging with stop pin 55 which could be incorporated into the housing 31. This configuration of bearing 23, centering spring 24, and stop pin 55 is mirrored opposite on both sides of the busbar 22, and held in place by set screw 25, ensuring that when the handle 17 is released the busbar 22 returns to the neutral position. Vibrato apparatus 10 is preferably composed of metal, however, other durable resilient materials may be used such as composites, plastics, or the like. The pivot axis is preferably oriented essentially parallel to but distanced from the string plane and is transversely oriented to the longitudinal direction.

Figure 5:
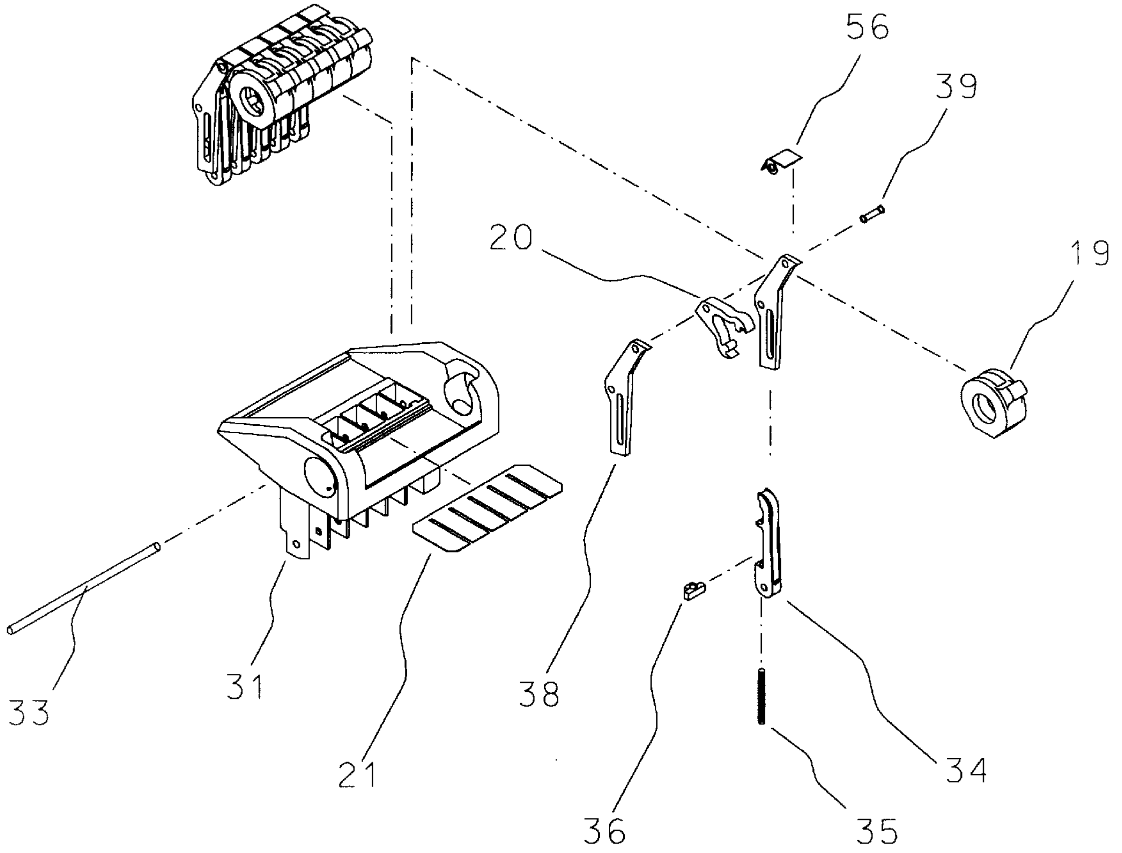
FIG. 5 shows a perspective view of the levers, lever pin, capture spring, switch, switch détente spring, lever linkage, rocker arms, rocker shaft, rate adjustment slug, rate adjustment screw and housing unit components for such vibrato apparatus, according to the invention.
Figure 6:
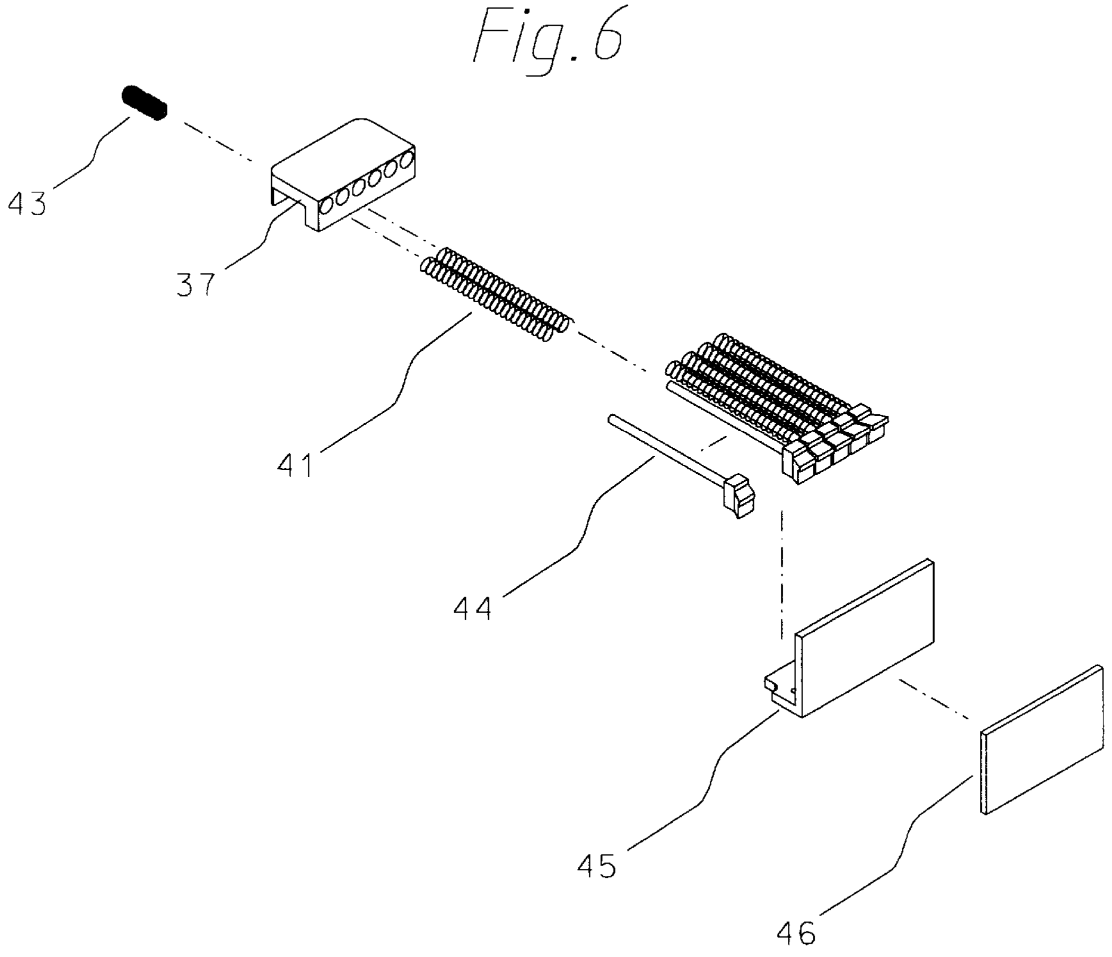
FIG. 6 shows a perspective view of the spring bank components, string plate, and tensioner mount for such vibrato apparatus, according to the invention.
Figure 7:
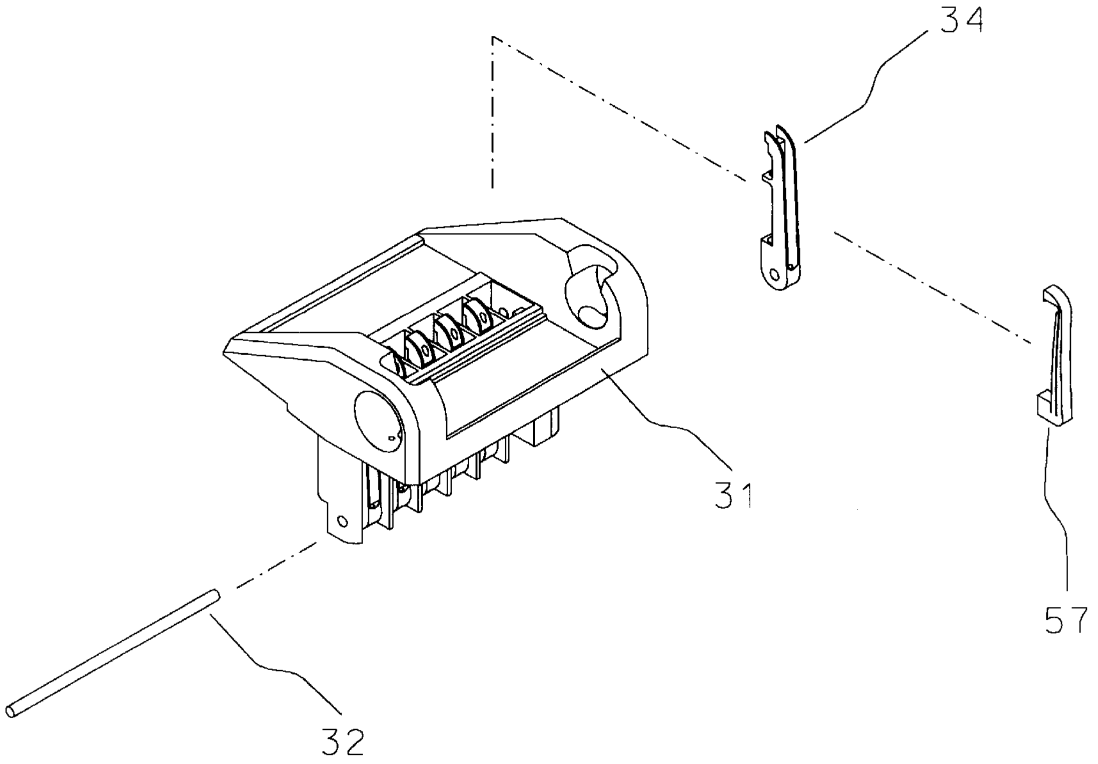
FIG. 7 shows a perspective view of the rocker arm, strain spring and housing unit for such vibrato apparatus, according to the invention.
Figure 8:
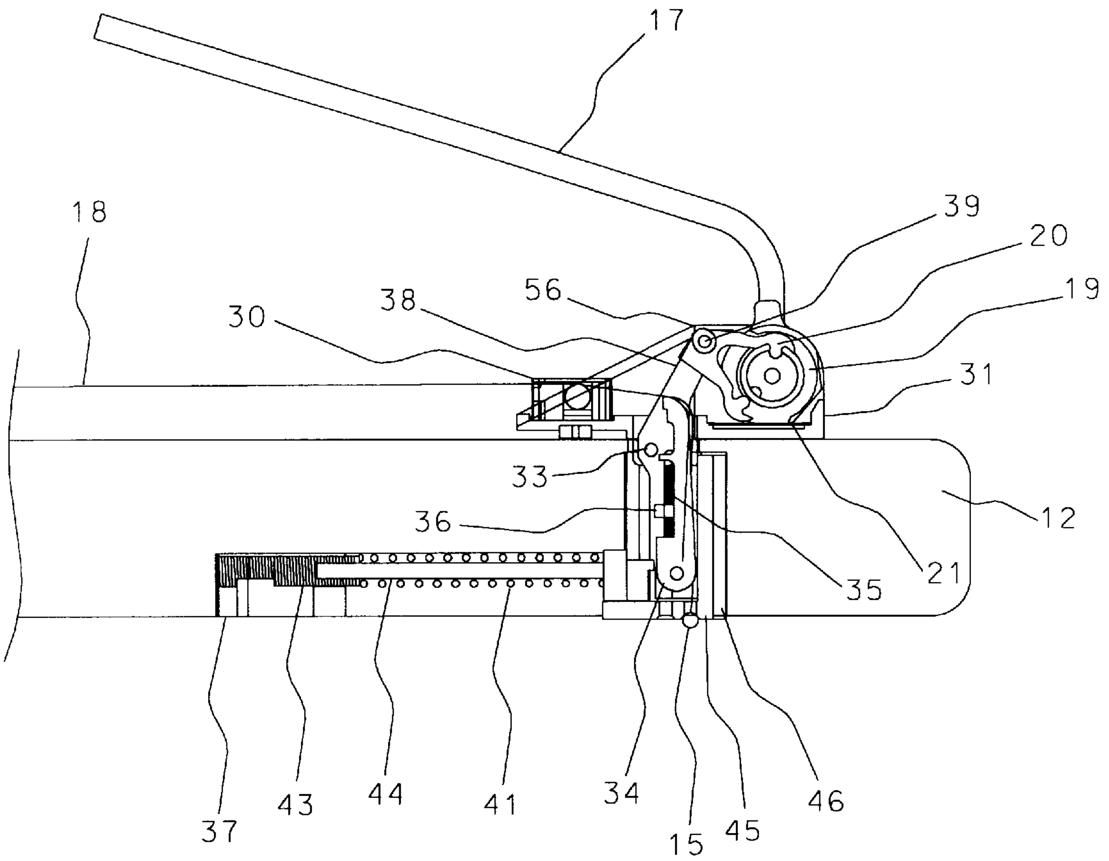
FIG. 8 shows a cross sectional view according to the section line in FIG. 1, with switch in a forward position, operably linking lever to bus bar, according to the invention.

As shown in FIGS. 5, 7, and 8, a plurality of vertically pivoting rocker arm 34 each resistibly braced against string body end 15 of a respective string 18 are operably linked via a rate adjustment slug 36 to a lever means 38, the lever means 38 pivoting on lever shaft 33 and being resistibly braced against spring means, preferably a counter spring 41 and to bus bar 22 via lever linkage 20. Rocker arm 34, rate adjustment screw 35, rate adjustment slug 36, and lever linkage 20 is flanked on two sides by lever means 38. Lever pin 39 fastens the lever linkage 20 to the lever means 38 and is held in place by the capture spring 56 which serves both to hold the lever linkage 20, lever means 38, and lever pin 39 together and also acts to return the lever linkage 20 to a neutral setting when the switch means 19 is returned to the middle position. Lever means 38 is resistibly braced against spring means, comprised of spring mandrel 44 sleeved by counter spring 41 braced against spring resistance screw 43 which is housed by the spring holder 37. A rate change adjustment means, preferably rate adjustment slug 36, is communicatively linked to the rocker arm 34 via rate adjustment screw 35 so that by varying a lever moment or position of bus bar 22 results in movement of the plurality of rocker arm 34 which are each selectively moved thereby altering the tuning of strings 18.

Best seen in FIGS. 5 and 8 are switch means for allowing independent control of tuning and pitch change for each string preferably comprising a plurality of switch means 19 each operably braced against a switch détente spring 21, said switch means pivots around bus bar 22 engaging the lever linkage 20. Rocker arm 34 of vibrato apparatus 10 preferably includes rocker shaft 32, illustrated in the perspective shown in FIG. 5 and 7, rate adjustment slug 36 attached to rate adjustment screw 35. Rocker arm 34 houses strain spring 57 which is resistably braced against string body end 15.

Figure 2:
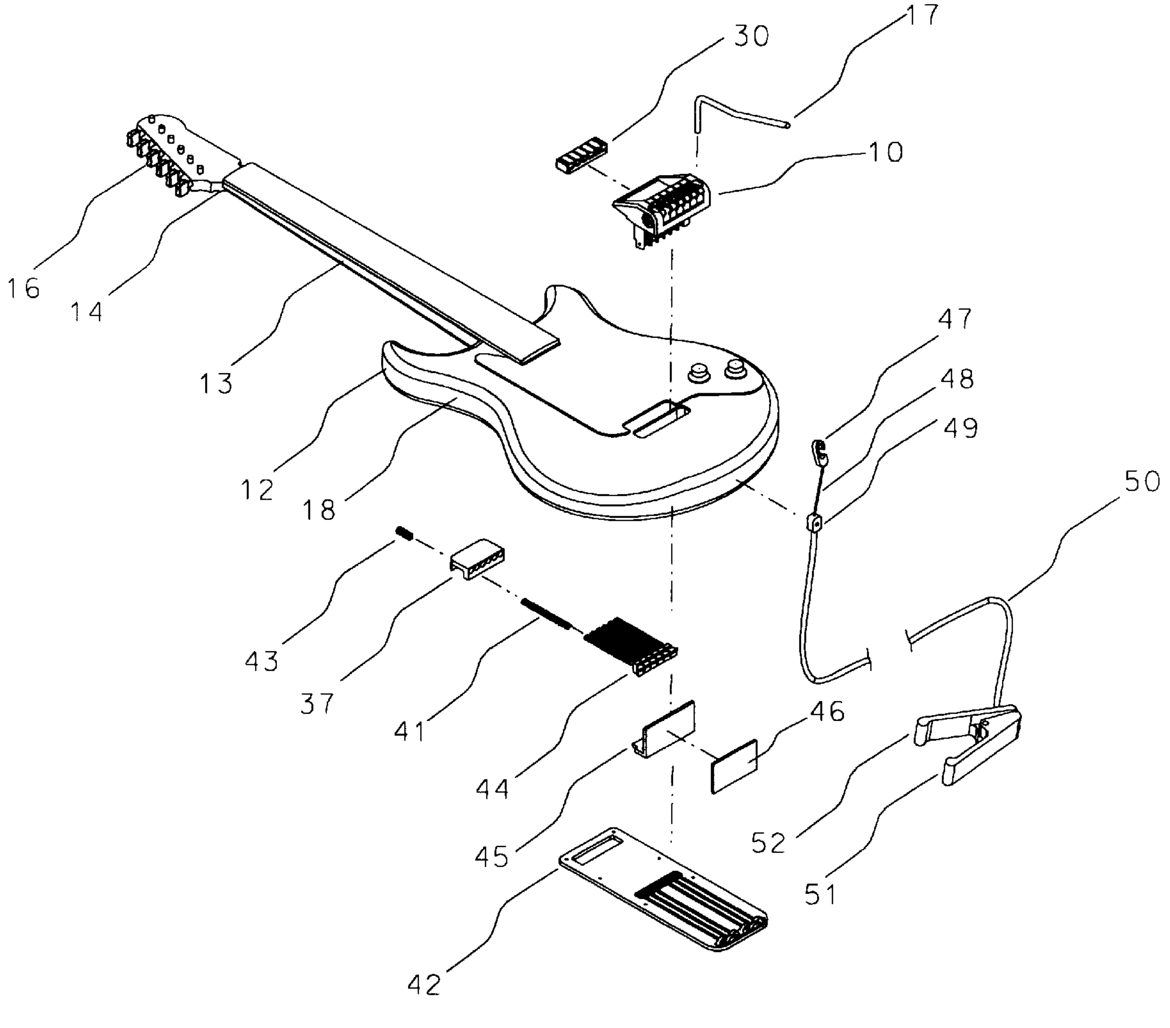
FIG. 2 shows a perspective view of the sub assembly for such vibrato apparatus with stringed instrument, according to the invention.
Figure 3:
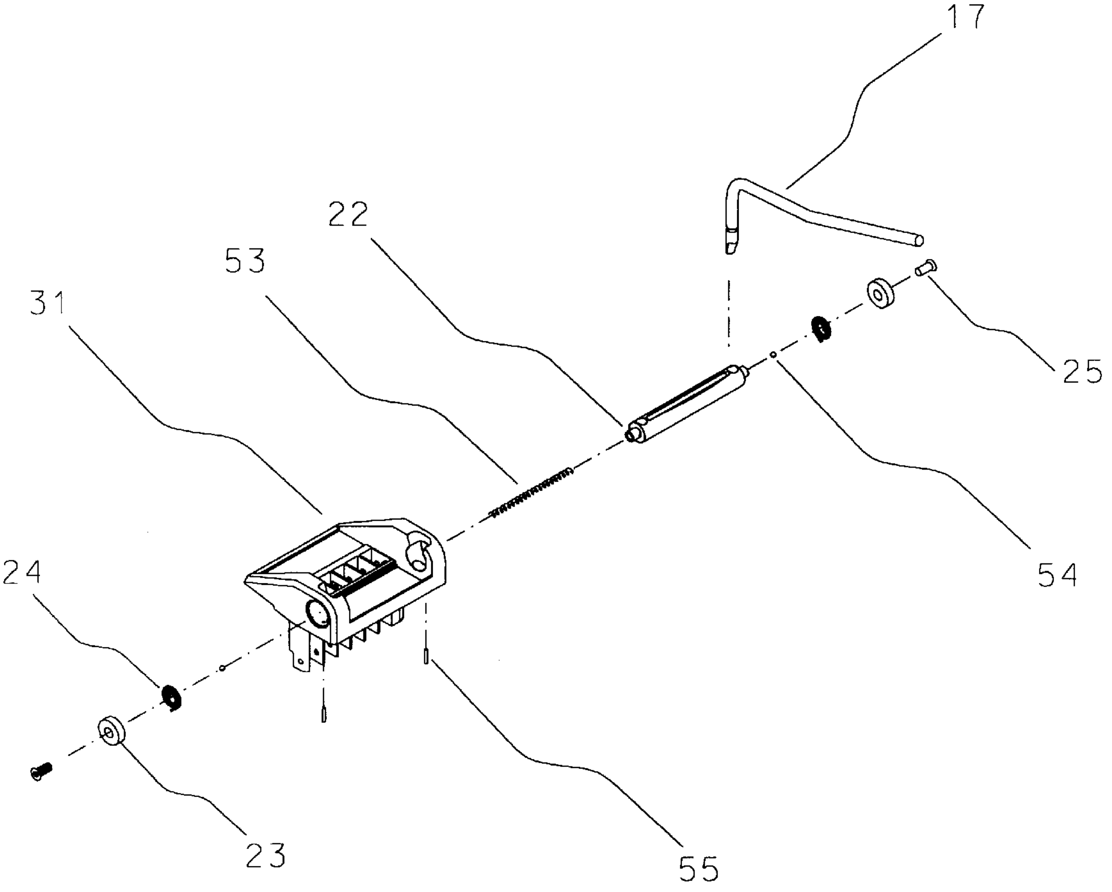
FIG. 3 shows a perspective view of the bus bar components, handle with cam end, and housing of such vibrato apparatus, according to the invention.
Figure 4:
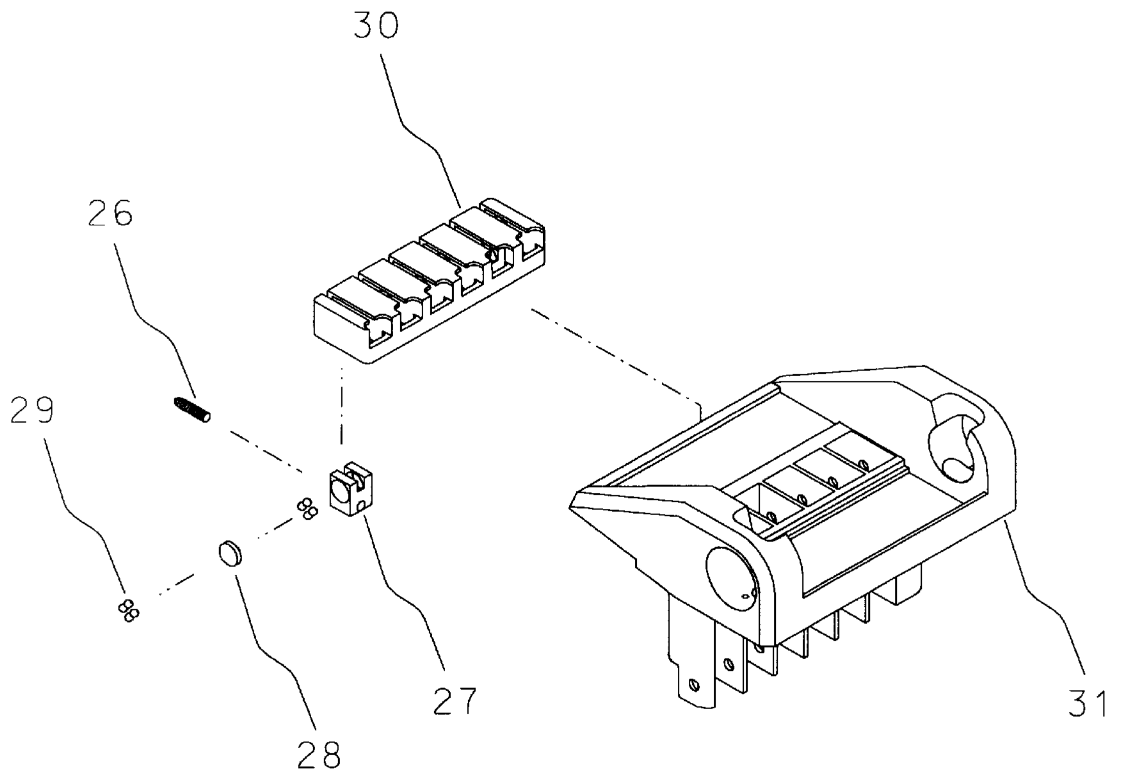
FIG. 4 shows a perspective view of the saddles and housing components for such vibrato apparatus, according to the invention.

In accordance with the present invention there is also provided an integrated saddle best seen in FIGS. 1, 2, and 4. Housing 31 secures a saddle housing 30 which in turn secures a plurality of saddle inner member 27. A saddle housing 30 is preferably slotted parallel to the strings 18, thereby holding the saddle inner member 27 and functioning as an outer race for bearings 29 and positioning the roller 28 by slideable engagement within the saddle housing 30 in both the forward and rearward directions in the slot in saddle housing 30, which are preferably oriented parallel to the strings 18. Set screw 26 is preferably secured in an aperture in the bottom of saddle inner member 27. Saddle inner member 27 includes a lateral aperture drilled therein houses bearings 29 and nestled between the bearings 29 is roller 28 which is preferably provided with beveled sides for engagement with the bearings 29. Saddle inner member 27 is preferably slotted on its top surface as shown parallel to the strings 18. A set screw 26 is secured in an aperture operably aligned to an aperture in saddle inner member 27. Saddle housing 30 is thereby mounted as shown in FIGS. 1, 2, 8, and 9.

Figure 9:
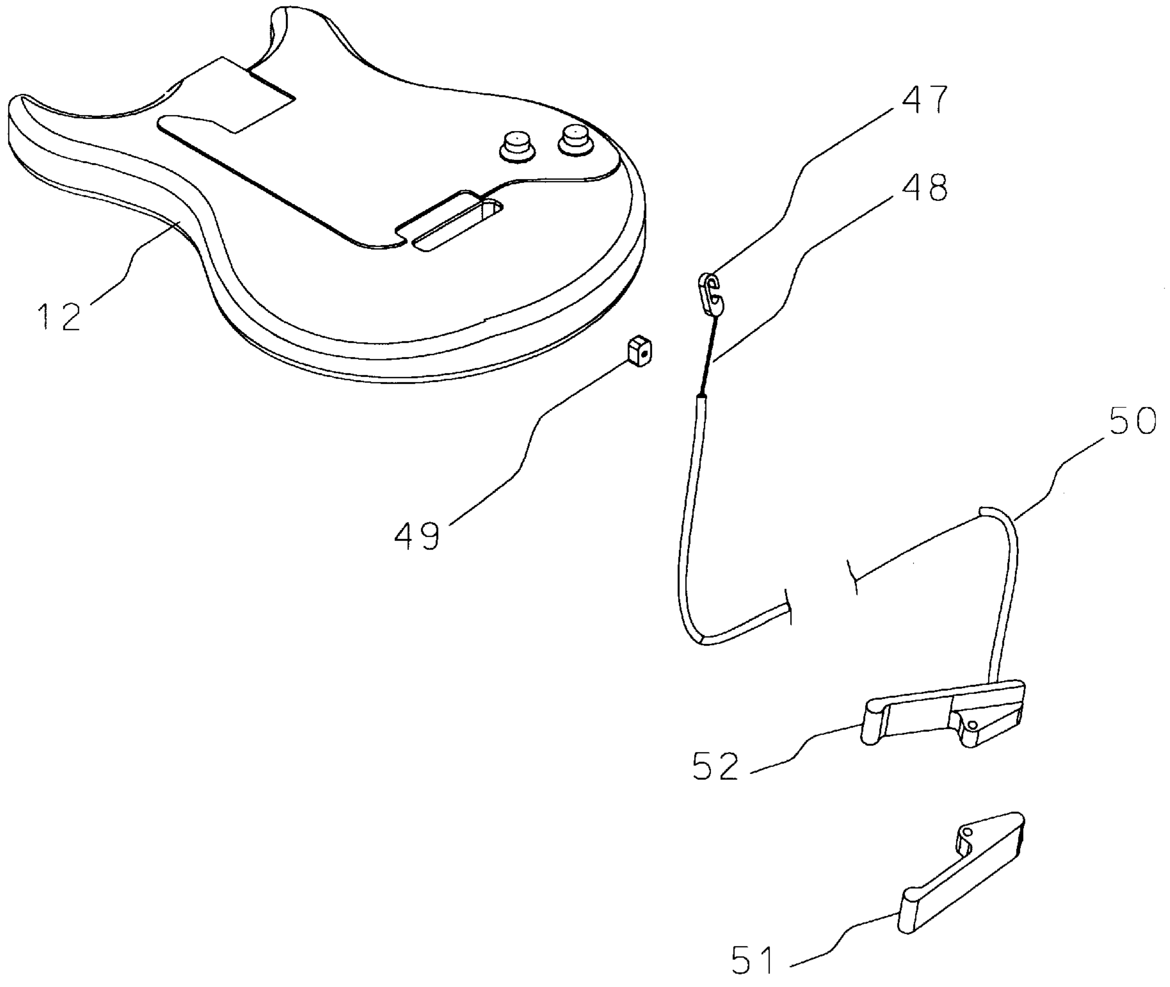
FIG. 9 shows a perspective of the components for the remote activation device of such vibrato apparatus according to the invention.

With reference to FIGS. 1, 2, and 9, a remote activation unit for use in different locations, i.e. behind the guitar against the hip, between one's elbow and the guitar, as a foot peddle, etc. is provided and preferably includes a remote attachment 47 which may be a hook, ring, wire, or other mechanical fastening means which fasten to the handle of the vibrato apparatus and is connected to the guitar end of cable 48. Cable 48 is encompassed in cable sleeve 50 which surrounds the cable. Mount 49 fastens to the bottom of the guitar where the strap anchors are and secures sleeve 50. This installation results in no damage or alteration to the instrument using the existing wood screw on the guitar. Leverage means comprising bottom plate 51 and top plate 52 are provided for tensioning cable 48 best seen in FIGS. 1, 2, and 9.

Figure 10:
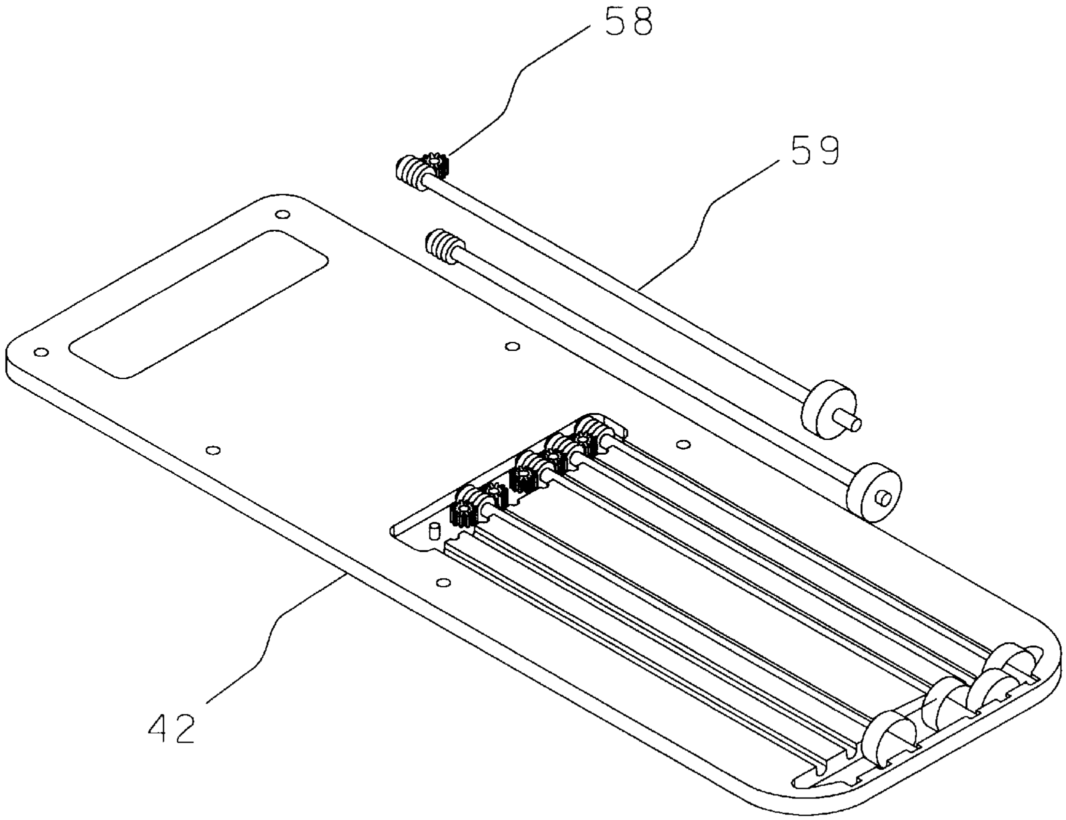
FIG. 10 shows a perspective view of the back plate with alternate tuners, according to the invention.
Figure 11:
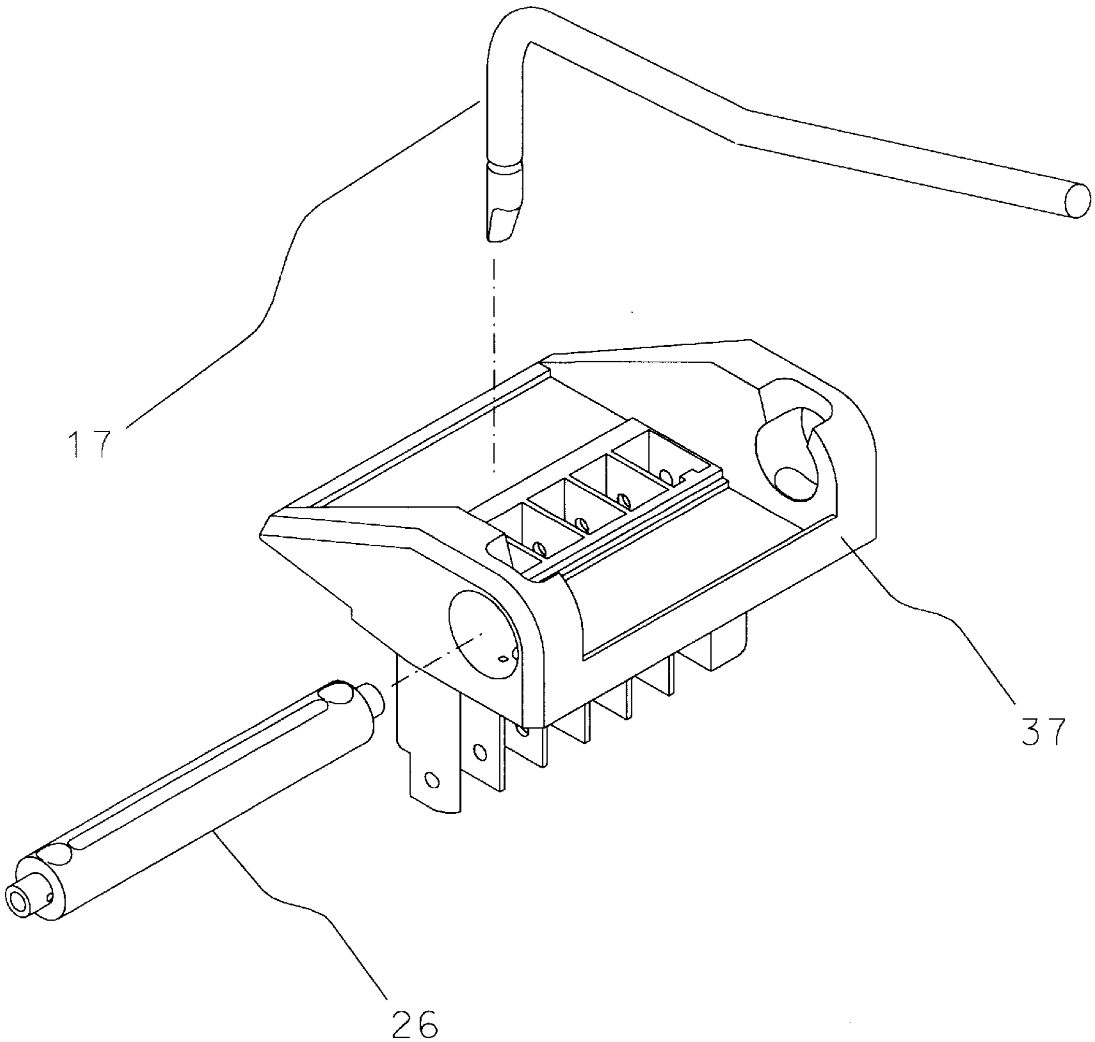
FIG. 11 shows an exploded view of the handle with the cam end visible, according to the invention.

In FIGS. 2 and 10, an alternate tuning accessory is shown which will enable the user to more easily change the alternate tuning or rate change of the instrument if desired. The alternate tuning assembly preferably includes a back plate 42, alternate tuning screw 59, and alternate tuning gear 58, which is integrally equipped with means for engaging rate adjustment screw 35. The plurality of string body ends 15 are braced against string plate 45 which is located on the back of the instrument and due to its rigidity is used for tuning stability, it also acts as part of the mounting means along with tensioner mount 46.

In operation and use vibrato apparatus 10 provides a simple yet highly efficient means allowing for individual and independent string tension adjustments while providing tuning stability for a stringed instrument. The vibrato apparatus of the present invention allows the user to determine the individual rate at which each string 18 is to be altered the user can easily select which string 18 or combination of strings is to be altered in pitch. Further the present invention allows the user to raise, lower, or leave unchanged simultaneously the tension in any string 18 or combination of strings simply by moving the handle 17 or remote lever.

Handle 17 can be used in two different modes. Inserting the handle in one end of the busbar allows the user to manipulate the handle and thus the apparatus in the traditional fashion, that is to pull or push on the handle effectively changing the tension on the strings. The inserted end of the handle 17 is shaped into a cam, which is mated into the housing at the alternate location in the busbar, rotating the handle about its axis within the busbar causes the lobed surface of the cam to ride up on the housing effectively rotating the bus bar. In this embodiment rotating the handle ninety degrees causes the cam to be fully engaged, rotating the cam an additional one hundred and eighty degrees will not effect the busbars rotation. The busbar is effectively locked. Rotating the handle a final ninety degrees relaxes the busbar back to its original position. Accordingly, different cam configurations utilizing multiple lobes and /or different degrees of engagement could be used. The handle is constructed with a groove around its circumference near the cam end, this is to allow a handle détente spring 53, détente ball 54 combination to effectively lock the handle within the busbar.

Additionally, soem of the strings, particularly the thinnest are susceptible to breakage if significant additional tension is applied, therefore these strings are equipped with a strain relief spring 57 nestled within the rocker arm. The strain relief spring 57 is designed such that when installed in the rocker arm it is snapped into place allowing forward but not reverse movement. The spring is normally under tension more than equivalent to the tension the string would apply in order to prevent the spring from bending due to the normal tension of the string. Additional tension on the string causes the strain relief spring 57 to flex, thus preventing over stressing of the string. In order to facilitate this action upon the string a block can be incorporated within the housing and behind the spring determining the exact location for the spring to give.

A proposed theory of operation for the present invention is premised on the rate of change in pitch of a string being determined in part by the string's diameter. In a typical single lever system equivalent displacements that would significantly alter the pitch of a heavy gauge string effect only subtle changes on a lighter gauge string. Marin Mersenne (1588–1648) describes the law of the fundamental frequency of a stretched string as:

$$f \propto \frac{1}{L}\sqrt{\frac{F}{W}}$$

Where L=length of string, F=force and W=mass or weight of string

Vibrato apparati change the force of tension upon a string by stretching or relaxing the string, while neglibly affecting the length or total mass of the vibrating length. Since we are concerned primarily with the force upon the strings with the other factors remaining equal, Mersennes equation can be simplified to read:

$$f\sqrt{F}$$

Where f is frequency and F is force.

The proportional force of strain on strings of the same material sharing the same modulus of elasticity, yet different diameters is given as the displacement (D) times the string's cross section area, in this case, $\pi r^2$.

Mersennes equation can be modified to read:

$$f \propto \sqrt{\Delta * \pi r^2}$$

If the strings are equally displaced the formula can read:

F r

We see that with same displacement a given string Y one fourth the diameter of a given string X, will change proportionaly one fourth in pitch as much as string X. Conversely, raising the pitch of string Y proportionally to that of string X would require 16 times the displacement since:

F √ F̅ √ Δ̅

Therefore, keeping the musical intervals the same, string Y and string X are displaced at a ratio of 16:1. Greater ratios may be desirable for the user, in order to change string A at a musical interval greater than string B.

In previous designs where one lever is used increasing the rate the string is altered for a given movement of the handle was accomplished by increasing the length of the lever: doubling the lever doubles the rate the string is changed.

Figure 12:
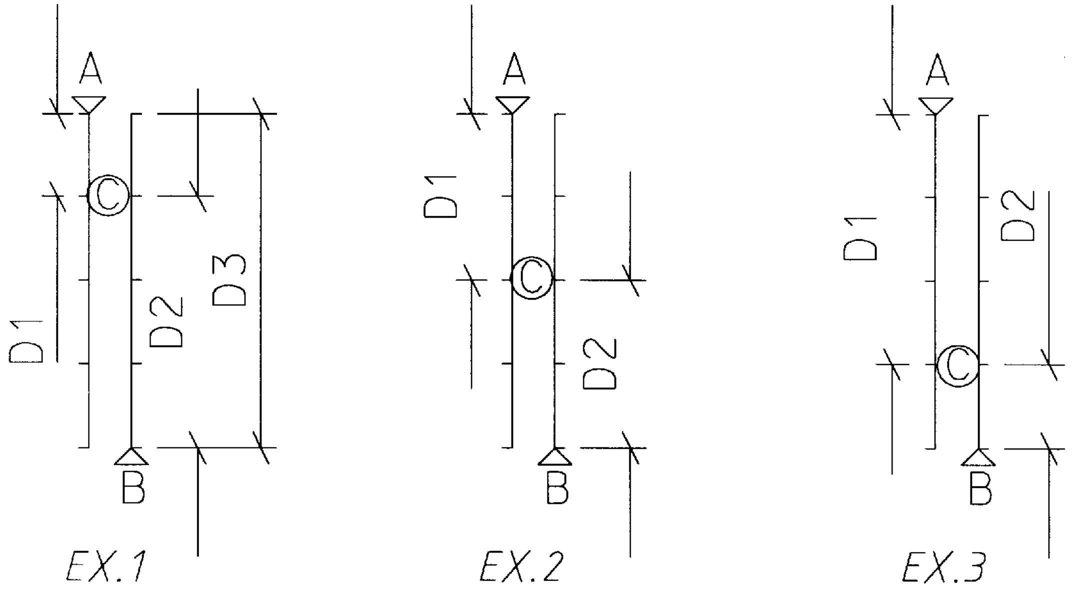
FIG. 12 shows a schemata of the compound lever system, according to the invention.

A very large ratio of rate change variation becomes available to the user with an additional lever and a rate adjustment slug which changes the fulcrum point between the two levers. In this embodiment, utilizing two levers compounds the range of values which may be taken by the rate of change as is demonstrated in FIG. 12. Ex. 1 shows slug C At one quarter of lever B. Ex. 2 shows slug C At one half of lever B. Ex. 3 shows slug C At three quarters of lever B. The rate of string displacement (D) is determined by the location of the rate adjustment slug between the lever linkage and the rocker arm. The rate of change is proportional to the distance of the rate adjustment slug from the lever linkage fulcrum times the overall length of the rocker arm divided by the distance of the rate adjustment slug from the rocker arm fulcrum.

$$\Delta \propto D1 \times \frac{D3}{D2}$$

An equivalent movement of lever A would causing Ex.1 to move one unit, Ex. 2 would move three units and Ex. 3 nine units.

These advantages and other modifications will readily occur to those skilled in the art. The present invention in its broader aspects is, therefore, not limited to the specific examples and details which have been given. Accordingly, departures from such examples and details may be made without departing from the spirit and scope of the invention.

What is claimed is:

1. A vibrato apparatus for a stringed musical instrument, the instrument having a body, a neck extending from the body, tuning means disposed on the neck and the vibrato apparatus disposed on the body to demarcate a string plane and a vibrating portion of a plurality of strings which extend in a longitudinal direction in the string plane;

a saddle housing unit containing a plurality of inner members forming a saddle on which the plurality of strings terminate at one end of the vibrating portion, a bus bar secured to an apparatus housing disposed on the body and connected to means for pivoting the busbar within a range of positions relative to the body about a pivot axis, the pivot axis being essentially parallel to but distanced from the string plane and transversely oriented to the longitudinal direction;

a plurality of vertical pivoting rocker arms, each arm supporting a body end of a respective one of said plurality of strings and operably connected to two lever means for resistibly bracing against a switch détente spring and is operably connected to the bus bar;

a plurality of rate adjustment slug means disposed so that each arm of the plurality of rocker arms engages a respective one of the rate adjustment slug means to operably connect one of the plurality or rocker arms to two lever means, thereby providing a means for adjusting the plurality or rocker arms to specifically alter the tuning of the plurality of strings; and the bus bar is operably linked to each of said paired lever means by a switch and linkage means for providing pitch control independently fro each string of the plurality of strings, whereby pivoting a respective one paired lever means selectively alters the tuning of a corresponding one of the plurality of strings independent from a remaining plurality of strings.

* * * * *